US008155072B2

(12) United States Patent
Warrillow et al.

(10) Patent No.: US 8,155,072 B2
(45) Date of Patent: Apr. 10, 2012

(54) METHOD AND DEVICE FOR MANAGING RESOURCES SHARED BY DIFFERENT OPERATORS IN A COMMUNICATION SYSTEM

(75) Inventors: William Warrillow, Carnagh West (IE); Sean Murphy, Dublin (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1175 days.

(21) Appl. No.: 10/581,999

(22) PCT Filed: Dec. 9, 2003

(86) PCT No.: PCT/SE03/01922
§ 371 (c)(1),
(2), (4) Date: Mar. 20, 2007

(87) PCT Pub. No.: WO2005/057978
PCT Pub. Date: Jun. 23, 2005

(65) Prior Publication Data
US 2007/0264986 A1  Nov. 15, 2007

(51) Int. Cl.
*H04W 4/00* (2009.01)
(52) U.S. Cl. ........................ 370/330; 455/454
(58) Field of Classification Search ............ 370/229, 370/330, 331, 335, 336.1; 455/414.3, 432, 455/438, 452.1, 453
See application file for complete search history.

(56) References Cited

U.S. PATENT DOCUMENTS

| 5,805,633 | A  | * | 9/1998 | Uddenfeldt ................ 375/133 |
| 5,896,510 | A  |   | 4/1999 | Kanayama |
| 6,922,564 | B2 | * | 7/2005 | Witana .................. 455/452.2 |
| 7,218,937 | B2 | * | 5/2007 | Peltola et al. ............. 455/453 |
| 2002/0018459 | A1 | | 2/2002 | Desblancs et al. |
| 2004/0219912 | A1 | * | 11/2004 | Johansson et al. .......... 455/424 |
| 2005/0075129 | A1 | * | 4/2005 | Kuchibhotla et al. ...... 455/552.1 |

(Continued)

FOREIGN PATENT DOCUMENTS

EP   1 037 484 A1   9/2000

(Continued)

OTHER PUBLICATIONS

International Search Report for PCT/SE2003/001922 dated Jul. 15, 2004.

(Continued)

*Primary Examiner* — Aung S Moe
*Assistant Examiner* — Awet Haile
(74) *Attorney, Agent, or Firm* — Nixon & Vanderhye P.C.

(57) ABSTRACT

A method and device for managing resources in shared networks is based on a few basic comparisons between resources and/or thresholds. If an access request is received (202) and there are not enough resources available (204), the request is rejected (212). If there are resources available (204), there is a check to see if the resource is in a congested state (206). If not, then the connection is accepted (210). If the resource is in a congested state (206), then a test is performed (208) to determine whether or not the resources will be assigned to an operator who has already exceeded the assigned utilisation. If it has, then the connection is rejected (212), otherwise it is accepted (210). Preferred embodiments incorporating priority handling, re-negotiations and soft congestion are easily implemented. In a shared UTRAN, the functionalities for managing the radio baseband allocation for a shared Node B are preferably incorporated in the shared RNC.

43 Claims, 8 Drawing Sheets

U.S. PATENT DOCUMENTS

2005/0124353 A1 * 6/2005 Cave .............................. 455/453

FOREIGN PATENT DOCUMENTS

| EP | 1037484 | | 9/2000 |
| EP | 1 220 557 | A1 | 7/2002 |
| EP | 1220557 | | 7/2002 |
| EP | 1220557 | A1 * | 7/2002 |
| WO | 2004/004398 | | 1/2004 |
| WO | 2004/004398 | A1 | 1/2004 |

OTHER PUBLICATIONS

Canadian Office Action mailed Apr. 23, 2010 in corresponding CA application 2,544,727.

"Shared Networks for WCDMA: Focus on the Common Shared Network and Geographical Split Networks", Solution Description, Apr. 2003 (26 pages).

3GPP TS 25.433 V5.16.0; 3rd Generation Partnership Project; Technical Specification Group Radio Access Network; UTRAN Iub interface Node B Application Part (NBAP) signalling (Release 5), Sep. 2006 (654 pages).

Canadian Office Action dated Feb. 16, 2011 in corresponding Canadian Application No. 2,544,727 (2 pages).

Taiwanese Search Report with English translation dated Nov. 18, 2011 (7 pages).

* cited by examiner

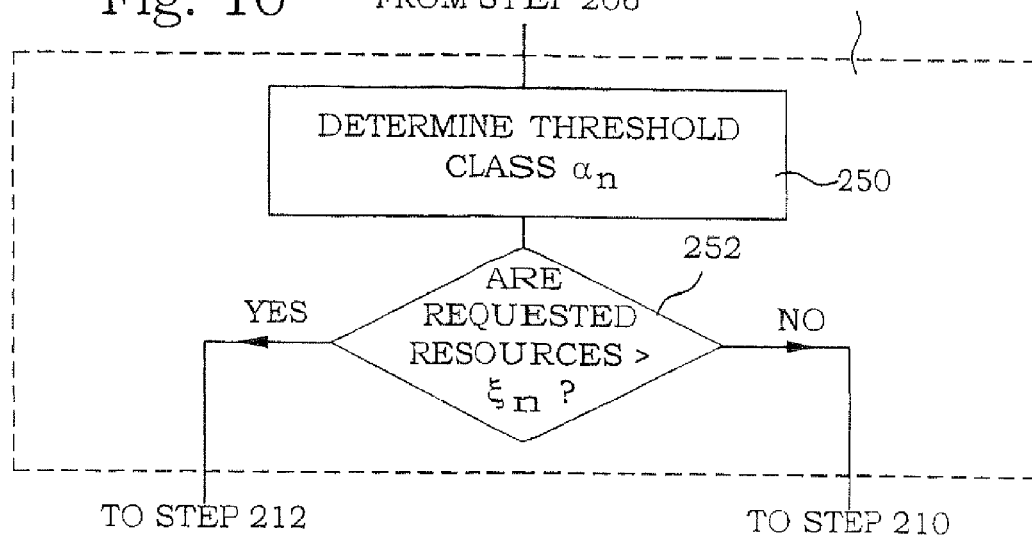
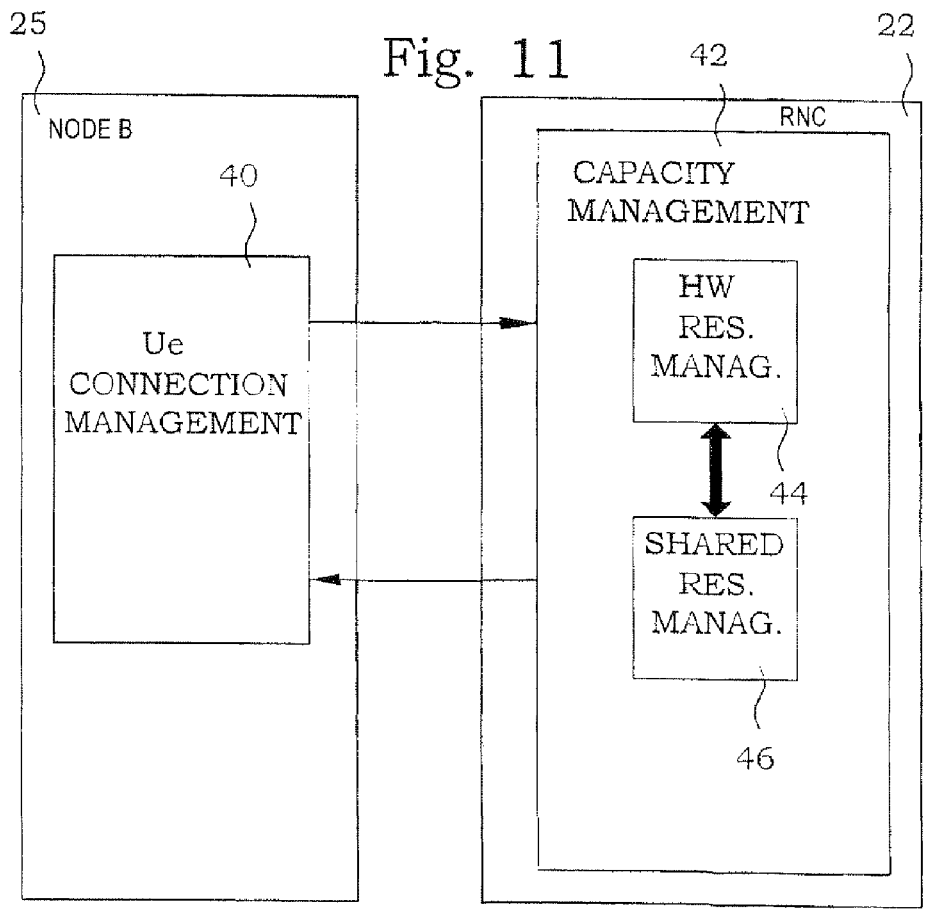

METHOD AND DEVICE FOR MANAGING RESOURCES SHARED BY DIFFERENT OPERATORS IN A COMMUNICATION SYSTEM

This application is the U.S. national phase of international application PCT/SE2004/001922 filed 9 Dec. 2003, which designated the U.S., the entire content of which is hereby incorporated by reference.

TECHNICAL FIELD

The present invention relates in general to communications networks and communications networks resource management methods, and in particular to such networks and methods handling resources shared by different operators.

BACKGROUND

Mobile communications networks are evolving rapidly at the present. Different operators are competing on the market, each of which has to provide an as complete network coverage as possible. Investment in network hardware is one of the largest costs when establishing mobile communications networks. Traditionally, each operator has provided his own network hardware. Fairly recently, network infrastructure sharing has been proposed as a means to enable a number of network operators to minimise costs associated with rolling out networks. A number of different approaches for sharing network resources have been proposed, such as: geographical shared networks, site sharing, shared UTRAN and common shared network. More details on the architecture of the different approaches to sharing are available in [1].

In shared networks, one or more operators share at least some infrastructure to deliver services to users. Hence, resources are shared on that part of the infrastructure that is shared to deliver the desired services. In some situations, there can be sharing of constrained resources. Sharing of such limited resources requires some thought and it is necessary to devise an approach for sharing these resources which is fair to all of the operators involved but yet maximises the utilisation of the constrained resource.

Shared networks are a relatively new concept and have not yet reached deployment status. Some modifications have been made to standards to facilitate development of shared networks. For example, it was necessary to modify standards to facilitate geographic network sharing such that a single infrastructure could look like more than one infrastructure. Product development work to date has focused on modifying existing solutions, which were developed for non-sharing contexts, to operate in a shared networking context. As such, little extra functionality or features have been added which is specific to the shared networking environment.

In relation to the specific issues associated with managing constrained resources in shared networks, no prior art solutions are known. However, one simple approach to manage the resources is to ignore the fact that the infrastructure is being shared and to allocate the resources as they are requested if there are sufficient resources available. However, this can result in an unfair distribution of resources. For example, if two operators are sharing the resources, each of which pays for 50% of the network rollout costs. Assume there is an agreement between the operators that both of them are entitled to 50% of the resources during congested periods. If, for some reason, there are greater demands for service amongst the customers of one operator, this operator can obtain a higher fraction of the resources than the agreed 50%.

SUMMARY

A general problem with managing constrained resources in a shared networking context according to prior art is that an overall maximised usage of the resources is difficult to reach, while the resources are allocated fairly to the operators. Moreover, additional functionalities as renegotiations of resource sizes, use of priority levels or situations with vastly changes in requested resource sizes make the situation even more complicated.

An object of the technology disclosed herein is thus to provide methods and devices for resource management providing a high utilisation of resources while providing a fair allocation between different operators. A further object is to integrate the usage of priority levels in such managing methods and devices. Yet a further object is to provide renegotiations of resources within the same management scheme. Another object is to reduce the influence by calls requesting large resources at near-congestion occasions.

In general words, a decision to accept or reject a received access request is taken based on at least three comparisons. The first comparison is between the total amount of free resources available in the communication system that can be used for the access and the requested amount of resources. The second comparison is made between a total amount of occupied resources if the access request would be accepted and a first threshold. The threshold corresponds to some kind of congestion level threshold. The third comparison is if a total amount of resources used by the operator in question if the access request would be accepted would exceed a second threshold. This second threshold is a portion of the total resources that is allocated to the operator in question. The access request is preferably accepted if the first comparison shows that there are resources available and if the second comparison tells that no congestion is present. The access request can also preferably be accepted if the second comparison tells that a congestion is present, but the operator has not yet utilised his allocated portion of the total resources.

In one example embodiment, a so-called soft congestion check is performed, in which access requests requiring large amount of resources gradually are discriminated when the system approaches congestion. In a further example embodiment, priorities of access requests that are not immediately accepted are checked, and if there are possibilities for pre-empting ongoing calls with lower priority to achieve enough free resources, such pre-empting is performed based on the degree of utilisation of the resources compared with the allocated portion. In yet another embodiment, renegotiations of ongoing calls for increasing the required amount of resources are handled as additional access requests for the difference between requested and presently used resources.

An advantage of the technology disclosed herein is that relatively simple procedures can achieve a fair and efficient management of limited resources. Furthermore, the procedures can be implemented in devices, which are easily integrated in or with presently existing hardware.

BRIEF DESCRIPTION OF THE DRAWINGS

The invention, together with further objects and advantages thereof, may best be understood by making reference to the following description taken together with the accompanying drawings, in which:

FIG. 10 is a flow diagram illustrating a part of the example embodiment of FIG. 9; and FIG. 11 is a block diagram illustrating an example embodiment of an implementation of a device.

DETAILED DESCRIPTION

In the present disclosure, a mobile communications network is considered, in which more than one operator share some communication resources. It is in this context assumed that each operator that is using the shared resource is assigned some proportion of the resources. This would be arrived at by some agreement between the operators. These proportions may be configured in a network element using a management system, for example.

Figure 1:
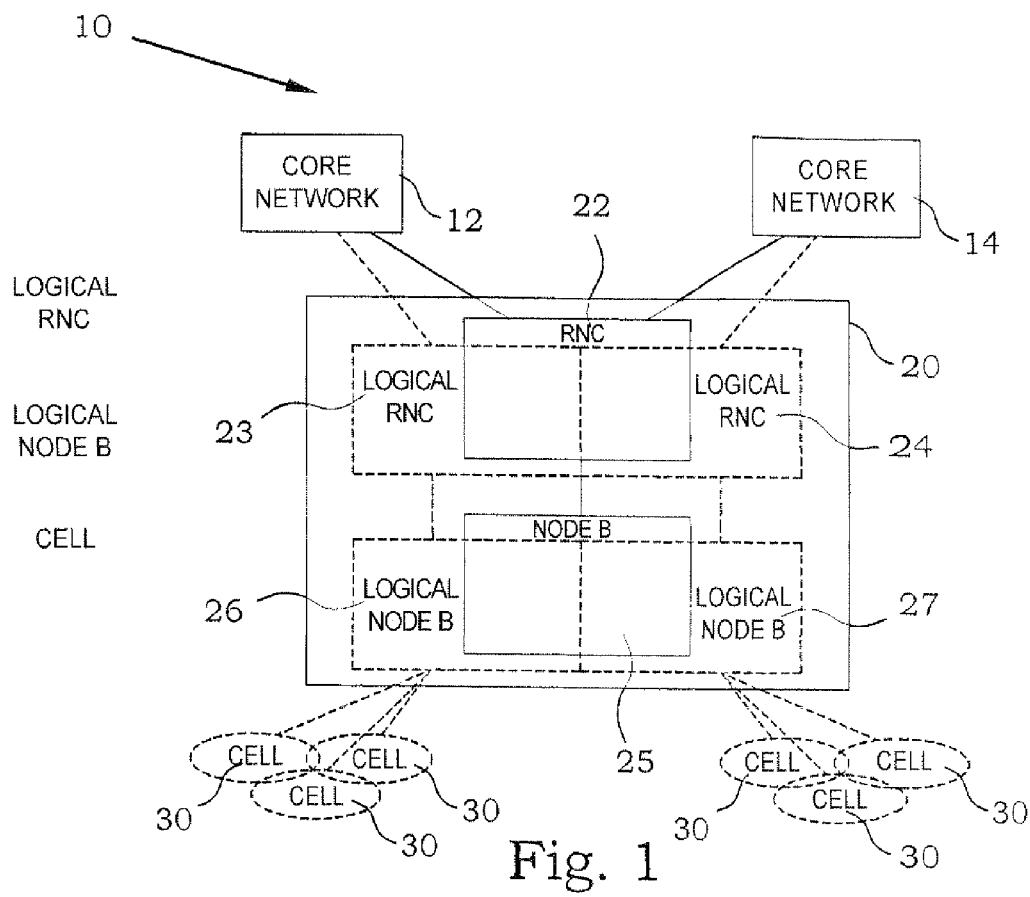
FIG. 1 is a block diagram of a mobile communications system in which more than one operator share hardware within the UTRAN (Universal mobile telecommunication system Terrestrial Radio Access Network)

An example of a mobile communications network 10 with shared resources is illustrated in FIG. 1. A core network 12 of a first operator is physically connected to a RNC (Radio Network Controller) 22 of a UTRAN 20. Likewise is a core network 14 of a second operator physically connected to the RNC 22. The UTRAN 20 further comprises a radio base station or Node B 25, physically connected to the RNC. The RNC 22 is a single device, but serves both operators in a more or less independent manner. The UTRAN 20 is thus a shared UTRAN.

In a logical plane, the setup will look differently. The part associated with the logical plane is drawn with broken lines in FIG. 1. In the logical plane, the core network 12 of the first operator is connected to a logical RNC 23. The core network 14 is likewise connected to a logical RNC 24 separate from the logical RNC 23. Each logical RNC 23, 24 has then respective logical node B:s 26, 27. These logical node B:s 26, 27 then serves cells 30 of the different operators. In the logical plane, the networks of the two operators are separated. However, in the physical realisation, many hardware devices are used in common, and also the available communication resources can be shared.

When administering shared resources, somewhat contradictory objectives are to be considered. First of all, since shared resources in most cases are limited in some sense, it is highly desirable that the available resources are used as efficiently as possible. If the available resources are divided between the different operators in a strict manner, where each operator gets his own resources and can not utilise any other resources, the efficiency is not maximised in a global sense. If one of the operators at a certain occasion requires more resources than his allocated portion and another operator at the same time has some spare resources, it would not be possible to temporarily "borrow" some resources. The overall efficiency is thus not maximised. On the other hand, if the resources are managed together without any concern about which operator uses which resource, one may end up in a congestion situation where one operator is denied any resources despite the fact that he has not yet fully utilised his allocated portion. It is desirable to have control over how the available resources are used by different operators, particularly at or close to congestion situations.

A basic idea of the technology disclosed herein is an approach, which can effect control over the resource utilisation between the two extreme cases. To maximise the overall efficiency, all connections are accepted during non-congested situations. If an excess of resources is available, it should be used, regardless for which operator. This means that an operator can exceed the agreed proportion when the resources are abundant. However, at or close to congestion, defined in some way, other rules have to be applied. According to the technology disclosed herein, new connections are only accepted during congested periods if the operator's agreed proportion is not exceeded.

The congestion state may be determined in a straightforward manner. If the aggregate resource utilisation exceeds some value, then the resource is deemed to be congested for the purposes of shared resource management. Such a congestion threshold is a configurable parameter. This may be a static parameter that is configured using a management system, for example. However, the congestion threshold could also be dependent on some other parameters, e.g. the time of the day, the day of the week, an average resource utilisation by the operators etc.

Figure 2:
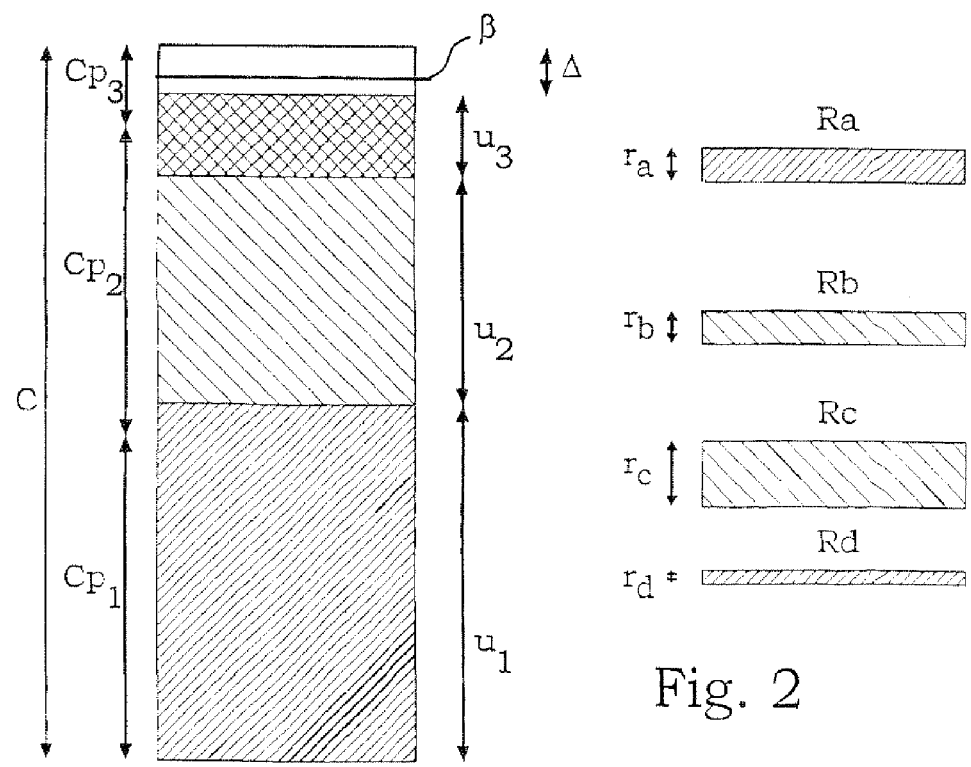
FIG. 2 is a diagram illustrating the allocating and usage of resources in a shared resources system.

In order to exemplify the behaviour of a system according to the technology disclosed herein, FIG. 2 schematically illustrates the shared resources of a fictive system as a rectangle. The area of the rectangle corresponds to the totally available resources C. In this example, three operators share the resources. In an agreement between the operators, operator 1 is allocated a portion $p_1$ of the total resources, i.e. an amount of resources $C \cdot p_1$ is intended for operator 1. Likewise, operator 2 is allocated a portion $p_2$ of the total resources, i.e. $C \cdot p_2$. Finally, operator 3 has agreed to only utilise an amount of resources corresponding to $C \cdot p_3$.

A congestion threshold $\beta$ is configured. Above this threshold, the system is in a congested state, and special actions have to be taken in order to utilise the remaining resources in a fair manner. In order to further exemplify the technology disclosed herein, a particular traffic situation is considered. The shared resources are used by the three operators in different amounts, $u_1$, $u_2$ and $u_3$, respectively. The rectangle of FIG. 2 is hatched in a corresponding manner. An amount of free resources $\Delta$ is still available. One may here realise that operator 1 at this very moment exceeds his agreed portion of the resources, since $u_1$ is larger than $C \cdot p_1$. Operator 2 uses a smaller amount of resources than the agreed proportion and operator 3 has a resource utilisation that is about equal to the agreed portion.

Let us consider four different cases. In the first case, a new access request Ra arrives for a customer using services delivered by operator 1. The access request requires an amount of resources corresponding to $r_a$. $r_a$ is smaller than $\Delta$, so there are enough resources available in the total system for handling the new request. However, the access request will utilise such a large portion of the resources that the total utilisation exceeds the congestion threshold $\beta$. Since the access request comes from operator 1, which already uses more than his allocated portion of resources, the remaining resources Δ should instead be "reserved" to operator 2. The access request Ra is therefore denied.

In a second case, a new access request Rb arrives for a user connected to operator 2. The access request requires an amount of resources corresponding to $r_b$, which is equal to $r_a$. Also here, $r_b$ is smaller than the amount of free resources Δ, but brings the entire system into a congested state, since the congestion threshold will be passed if the access request is accepted. However, operator 2 has not yet used his entire allocated portion of the total resources, and should have preference to the remaining resources. The new access request is thus accepted, and the system goes into a congested state.

In a third case, a new access request Rc arrives for a user connected to operator 2. The access request requires an amount of resources corresponding to $r_c$, which is larger than $r_b$. Here, $r_c$ is also larger than the amount of free resources Δ, which means that there are no possibilities to accept the access request unless any further prioritising and preempting of other calls are performed. In a basic version the access request is denied.

In a fourth case, a new access request Rd arrives for a user connected to operator 1. The access request requires an amount of resources corresponding to $r_d$, which is smaller than $r_a$. $r_d$ is indeed smaller than the amount of free resources Δ, and it is also small enough not to bring the entire system into a congested state. Even if the access request Rd is accepted, the total amount of utilised resources is below the congestion threshold β. In order to maximise the overall efficiency, the access request is accepted, although operator 1 already has exceeded his allocated portion.

Figure 3:
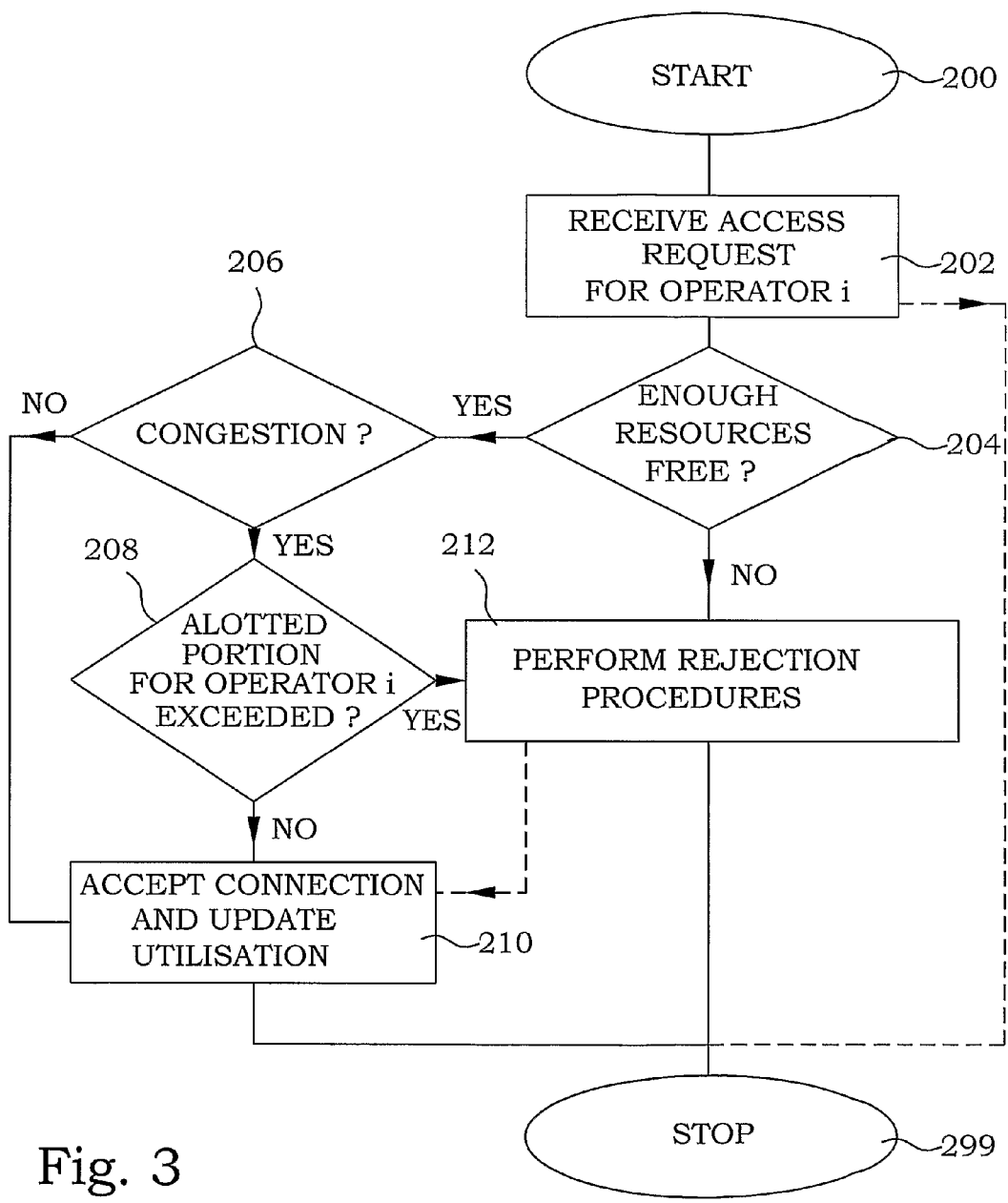
FIG. 3 is a flow diagram illustrating the main steps of a method according to an example embodiment.

FIG. 3 illustrates a flow diagram of the main steps in an example embodiment of a method according to the technology disclosed herein. The procedure starts in step 200. In step 202, an access request from a certain operator is received. The access request has an associated required amount of resources. Alternatives of this step are discussed further below. In step 204, it is determined if the associated required amount of resources of the access request is smaller than the total amount of free resources in the system. If the required amount of resources is too large, the procedure continues to rejection procedures (step 212) described more in detail below. If there instead are enough free resources, the procedure continues to step 206.

In step 206, a second determination is performed, where it is checked whether or not the system will be congested. In one embodiment, it is checked if the total utilised resources will be higher than the congestion threshold if the access request is accepted. The check is thus a check of a situation after an assumed accepting of the access request. If the utilisation is low enough, which means that a considerable amount of resources is available, in this embodiment any access requests will be accepted, and the process therefore continues to step 210. However, if the system is close to congestion and the total amount of utilised resources including the proposed new access exceeds the congestion threshold, other selection rules come into action. The procedure therefore continues to step 208.

In another embodiment, the congestion check is performed without considering the effect of the present access request, i.e. if the system already is congested, as defined by the congestion threshold. The check is thus a check of a situation before any assumed accepting of the access request. One realises that for such an approach, the threshold should be set lower than the congestion level in order to achieve a corresponding behaviour as in the first embodiment described above, by an amount corresponding to the required amount of resources. If one wants to avoid using different thresholds for different calls, the threshold could e.g. be set essentially equal to the congestion level minus an average size of required amounts of resources for access requests.

When coming to step 208, one knows that there are enough resources available but the system goes into congestion if the access request is accepted or already is in congestion (as defined by the threshold). In such a situation, operators not having fully used their allocated portion of the total resources should have preference to the remaining small amount of resources. In step 208 it is therefore in one embodiment determined if the operator in question will exceed its allocated portion of resources if the access request is accepted. The determination is thus a determination of a situation after an assumed accepting of the access request. If that is the case, the access request will be an object for the rejection procedure of step 212 and the remaining resources will in a typical case be saved to be used for operators having a lower degree of utilisation of its allocated resources. If the determination finds that the operator has remaining resources up to his allocated portion, the connection will be accepted and the procedure thus continues to step 210.

In another embodiment, the utilisation determination is performed without considering the effect of the present access request, i.e. if the operator already has exceeded the agreed level of utilisation, as defined by the allocated portion. The determination is thus a determination of a situation before any assumed accepting of the access request. If one wants to achieve exactly the same properties as above, the threshold value should be adjusted by the required amount of resources. The threshold could also be set e.g. equal to the portion of resources allocated to the operator in question minus an average required amount of resources for access requests.

Anyone skilled in the art realises that the behaviour of the resource management can be fine-tuned by adjusting the thresholds. The first threshold, i.e. corresponding to the congestion level gives the main dependence. A high congestion threshold will favour an efficient utilisation at the expense of the fairness of resource division between the operators. A low congestion threshold will instead increase the importance of keeping each operator within the agreed portion and reduce the importance of the overall efficiency. The second threshold, i.e. the threshold associated with each individual operator can also be fine-tuned. Utilising the first approach of determination of utilisation with incoming connection will put more weight on keeping the utilisation strictly below the agreed level, while the second approach of determination of utilisation only will allow for exceeding the agreed portion, but only with less than a single accepted call. By setting a threshold offset from the agreed level of utilisation, a fine-tuning can be achieved also here.

In step 210, the access request is accepted. At the same time, any stored values of utilisation are updated accordingly. The procedure is then ended in step 299.

In step 212 a rejection procedure is performed. In systems without priority levels for the access requests, the access request is simply rejected and the procedure is then ended in step 299. However, if call priority is applied, additional procedures have to be applied. Examples of such procedures are presented in alternative embodiments further below.

The broken lines are indicating possible flow paths for alternative embodiments described further below.

The embodiment of the method according to FIG. 3 can also be expressed in more mathematical terms. Let C be the total amount of resources and r the amount of the resources required by the connection requesting access to the network. Assume furthermore that there are n operators sharing the network. $u_i(t) \in [0,1]$ denotes the fraction of the total resource that is in use by operator i at time t. $p_i \in [0,1]$ is the proportion of resources allocated to operator i, and in a typical case $$\sum_{i=1}^{n} p_i = 1.$$

Finally $\beta \in [0,1]$ is the congestion threshold. The procedure can be described as follows:

An incoming connection or access request from operator i is received. The access request requires r units of the available resources. A first determination is performed whether the following inequality is fulfilled:

$$\sum_{i=1}^{n} u_i(t) + r/C \le 1$$

If sufficient resources are available, the next determination relates to the inequality:

$$\sum_{i=1}^{n} u_i(t) \ge T_c, \quad (1)$$

where $T_c$ is a first threshold. The threshold $T_c$ is in one preferred embodiment selected as:

$T_c = \beta$, and in another preferred embodiment selected as:

$T_c = \beta - r/C$.

The threshold can also be selected in other ways, fine-tuning the properties of the resource management. The system is concluded to be congested if the inequality (1) is fulfilled. If the system is concluded not to be congested, the access request is accepted, otherwise a third inequality is evaluated:

$u_i(t) > T_i$, where $T_i$ is a second threshold for the operator in question. The threshold $T_i$ is in one preferred embodiment selected as:

$T_i = p_i$, and in another preferred embodiment selected as:

$T_i = p_i - r/C$.

Other values of $T_i$ may also be used, preferably between the two ones presented here above, to fine-tune the behaviour of the resource management.

Since the quantities $u_i(t)$ are frequently used, they are preferably stored between different access requests. These quantities thus have to be updated when the resource usage is changed. If the access request is accepted, the $u_i(t)$ is updated as:

$u_i(t) + r/C \rightarrow u_i(t)$

Preferably, also the quantity $$\sum_{i=1}^{n} u_i(t)$$

is stored and also updated when an access request is accepted.

The stored utilisation $u_i(t)$ is also influenced by other activities. When a connection belonging to operator i that utilises r units of resources is released, the utilisation degree has to be updated according to:

$u_i(t) - r/C \rightarrow u_i(t)$.

The above procedures operate well for situations in which the resource allocation is linear or near linear. However, when the non-linearity of resource allocation in a system increases, the basic procedures described above have to be slightly modified. In such a case, an updating mechanism according to a preferred example embodiment can be applied. The linear shared resource allocation model described above can thus be used to model allocation schemes which are non-linear in some cases. The performance of the system can be improved if there are some communications between the above described module and another module which can maintain a more accurate measure of the non-linear resource utilisation.

Assume that a module operates according to a linear model, however, the actual system has slightly non-linear behaviour. Further assume that there is another module, external to the module incorporating the shared resource management, which can obtain more accurate resource utilisation information. Such information can be collected from different parts of a network. The base module is provided with this updated resource information and includes also this information to maximise efficiency and fairness. Consider a case, where the resource management module receive information that the number of units of the entire resources currently available is C' when the base module perceives it to be C. In this case, the utilisation $u_i(t)$ must be updated as:

$C'u_i(t)/C \rightarrow u_i(t)$ for each operator i.

In many mobile communications networks, calls are often associated with different priority levels. A call of a high priority should have preference to calls of lower priority. There are quite a number of different approaches to managing priority connections in different systems, some of which are quite complex. Furthermore, priority mechanisms may be configured in different ways, depending on how the operator chooses to operate the network.

A resource managing method and device according to the technology disclosed herein can easily be modified to also incorporate priority handling. One embodiment will be described here below, which permits high-priority connection requests to access the resource at the expense of lower priority connections, if necessary. Since this can involve pre-emption of calls, it is useful to integrate this with the functions that are aware of the shared nature of the resources in order to try to ensure that the resource is shared according to the policy agreed by the operators. The most important decision that needs to be made in this case is to determine which call or calls need to be terminated prematurely. Specifically, it can be desirable to differentiate between connections based on which operator they are associated with.

While the intention here is to enable the sharing mechanisms to be introduced into a scheme with prioritisation in a reasonably generic fashion, it should be noted that some assumptions have been made in the design of this embodiment which mean that it is not arbitrarily flexible. These assumptions have been made so as to minimise the coupling between the sharing and priority mechanisms and also to ensure that the system does not become too complex.

The scheme proposed in the present embodiment is designed for an environment in which there are a small amount of priority connections, i.e. most connections have the same priority with a few exceptions having higher priority. This is the case in most existing mobile networks today. It is highly important that the priority connection requests gain access to the network—typically they are for emergency use—and hence they can pre-empt lower priority calls.

Figure 4:
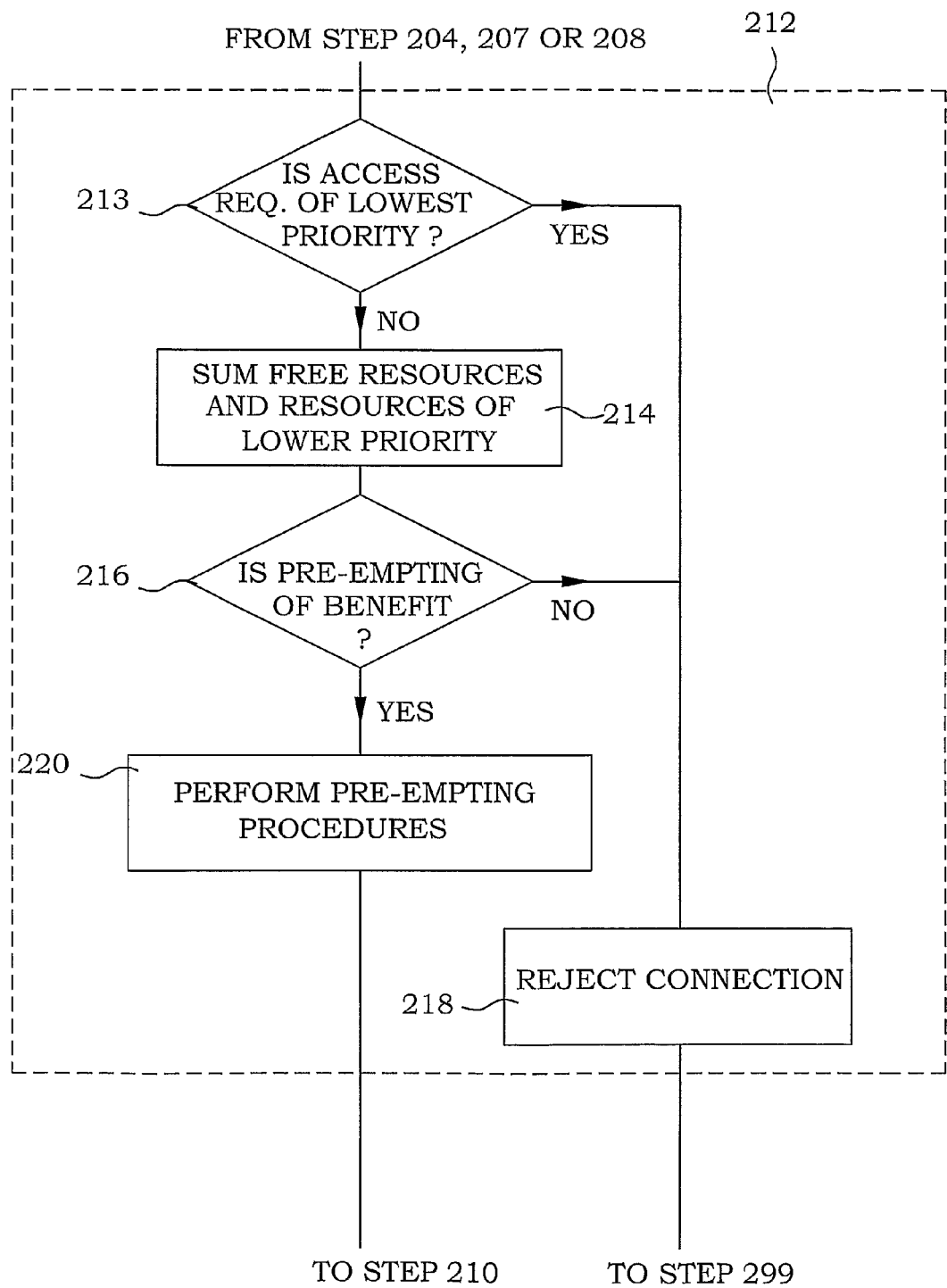
FIG. 4 is a part of a flow diagram illustrating a further example embodiment supporting priority levels.

The extended approach to admission control which is applicable in the case of priority connections follows the basic flow diagram of FIG. 3, however, including the flow path between the steps 212 and 210 (which was illustrated with a broken line in FIG. 3). The handling of priority questions are incorporated in the rejection procedure step 212. A detailed part flow diagram of the step 212 is illustrated in FIG. 4. The main step 212 is here illustrated as a broken box and comprises a number of substeps. The procedure flow enters step 212 from the step 204 or 208 in FIG. 3. (It can also be reached from a step 207, discussed further below.) In the first substep, step 213, it is concluded if the access request is of the lowest priority. In such a case, no preempting procedures are of use and the access request should be rejected in step 218. If the priority is not the lowest one, the procedure continues to step 214, where all presently occupied resources of a priority lower than the priority of the new access request are summed, and any free resources are added to this sum. This gives a total available amount of resources that can be used by the access request. In step 216, it is checked if this sum is larger than the required amount of resources of the new access request. If that is not the case, any preempting is meaningless and the access request has to be rejected in step 218 despite the high priority. If pre-emption will solve the problem of lack of resources, a preempting procedure is performed in step 220 and the procedure flow will then continue to step 210 of FIG. 3 to finalise the accepting of the access request, since there now are available resources.

Figure 5:
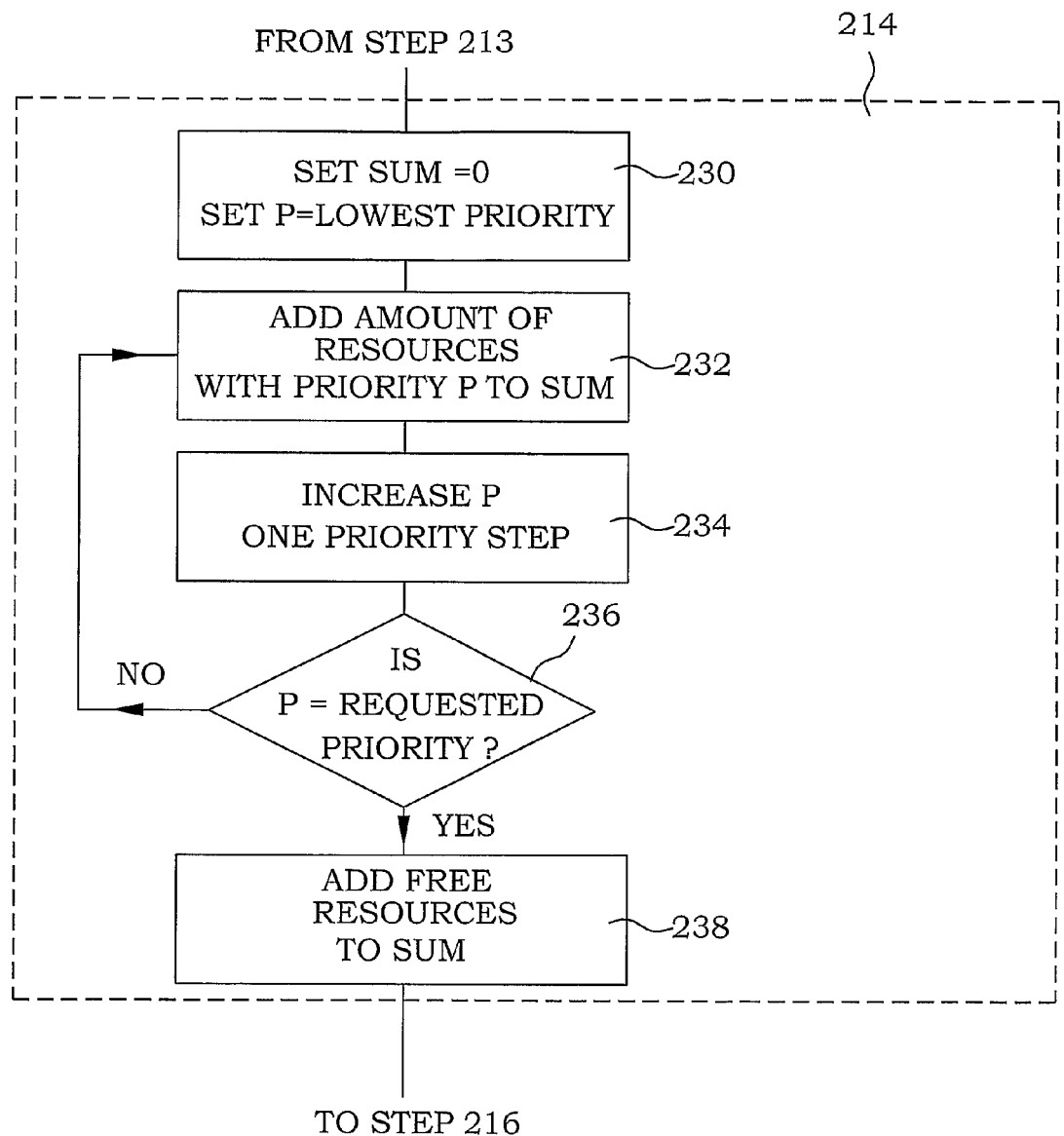
FIG. 5 is a flow diagram illustrating a part of the embodiment of FIG. 4.

The above flow diagram can also be expressed as follows. In the case of priority connections, it is not sufficient to determine whether or not there is sufficient unused capacity in the system as the criterion for determining whether or not the system can accommodate the new connection request. It could be the case that there is insufficient free capacity in the system for the incoming connection, but because it's a high priority connection, it should be accepted to the system. So, if the initial test for free capacity returns a negative result, a check is performed to see if the aggregate capacity used by lower priority connections is less than the capacity requested by the incoming connection. If it is, then it is possible to accept the incoming higher priority connection by preempting some lower priority connections. The approach to determining the aggregate capacity consumed by lower priority connections can be made quite straightforward. An embodiment of this part step is illustrated in FIG. 5.

The procedure flow arrives from step 213. In step 230, a sum is initiated to zero and a priority parameter is set to the lowest priority. In step 232, the amount of resources occupied by connections having a priority equal to the priority parameter is added to the sum. The priority parameter is then increased one step in step 234. In step 236, it is investigated if the priority parameter is equal to the priority of the access request. If that is not the case, the flow returns back to step 232 to add more resources. If the priority of the access request is reached, the procedure continues to step 238, where any free resources are added to the sum. The procedure then continues with step 216 of FIG. 4.

If the capacity used by the lower priority connections is less than the capacity required for the incoming connection, then the incoming connection request cannot be accommodated. If, however, the converse is true, then the incoming connection request can be accepted if some existing connections are ejected from the system.

Figure 6:
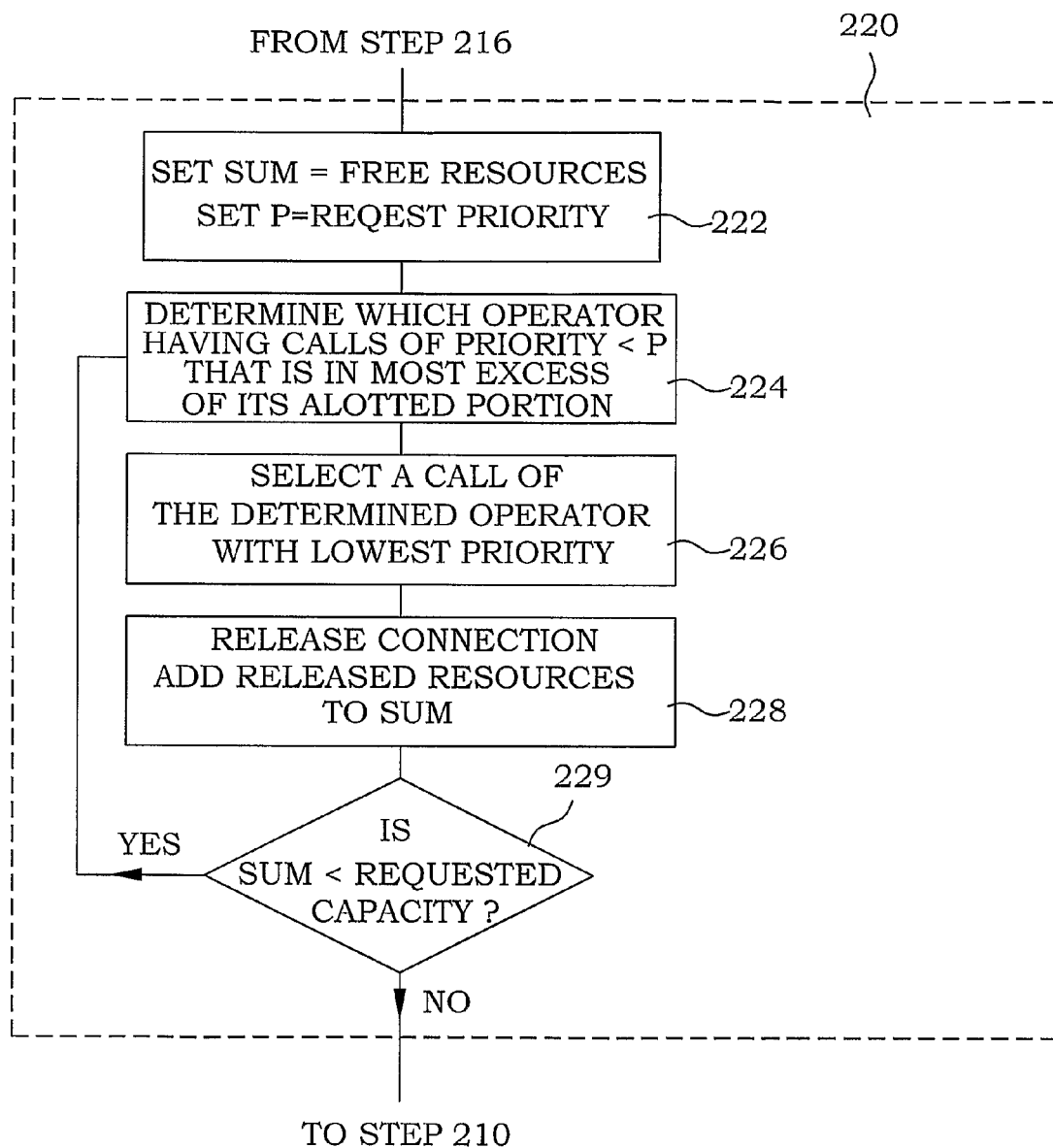
FIG. 6 is a flow diagram illustrating another part of the embodiment of FIG. 4.

In step 220 of FIG. 4, a procedure is performed to determine which connections should be removed from the system. An embodiment of this step is illustrated in FIG. 6. The procedure flow arrives from step 216. In step 222, a sum is initiated as the amount of free resources in the system, and a priority parameter P is set to the priority of the access request. In step 224, it is determined which operator among operators having any connections or calls of priority lower than P that is in most excess of its allocated portion or agreed target resources utilisation. A call from this operator is selected, preferably of the lowest possible priority level, in step 226. In step 228, this connection is released and the amount of released resources is added to the sum. In step 229, it is then determined if the performed preempting is enough or if further pre-empting actions have to be performed. When enough free resources are achieved, the procedure continues to step 210 of FIG. 3.

Anyone skilled in the art realises that a number of variants of procedures could be envisaged here. The above embodiment is one, which attempts to maintain the appropriate load balance between the operators when determining which connections to remove from the system. The procedure works by determining which operator is in most excess of its targeted utilisation. This operator must make room for the incoming connection by removing one of its connections from the system. Any rule can be chosen for this, but a reasonable rule used in the present embodiment is to reject a connection with the lowest possible priority. An alternative could be to search for a connection that uses just enough capacity to enable the high-priority call. This procedure is repeated, with a connection being removed each time until there is sufficient capacity available for the incoming connection.

Note that this approach is not guaranteed to ensure that the resources are shared according to the defined policy, since higher priority calls can preempt lower priority ones of other operators. Take, for example, the extreme situation where one operator generates only high-priority calls and the other low priority connections for some period of time. If the arrival rates are sufficiently high, the operator that is generating the high-priority connections will ultimately consume the entire resources.

This was a design decision in the above embodiment. Since it was assumed that the frequency of high-priority calls would be quite low, it is not necessary to have a very complex mechanism, which integrates both resources sharing and priority.

In some cases, either a terminal or the network may desire to renegotiate the amount of resources allocated to a particular connection. The shared resource allocation functions should be able to deal with this eventuality. In a first approach, the shared resource allocation management does not influence the decision to adjust the resources allocated to the connection. It is then assumed that such adjustments are typically rare and are generally relatively small. In such a case, the adjustments are just performed.

However, there might be problems when the system reaches congestion conditions. Hence, an embodiment of a procedure to deal with this within the frame of shared resources is described here. The shared resource allocation functions then also influence the decision to adjust the resources allocated to the connection.

Figure 7:
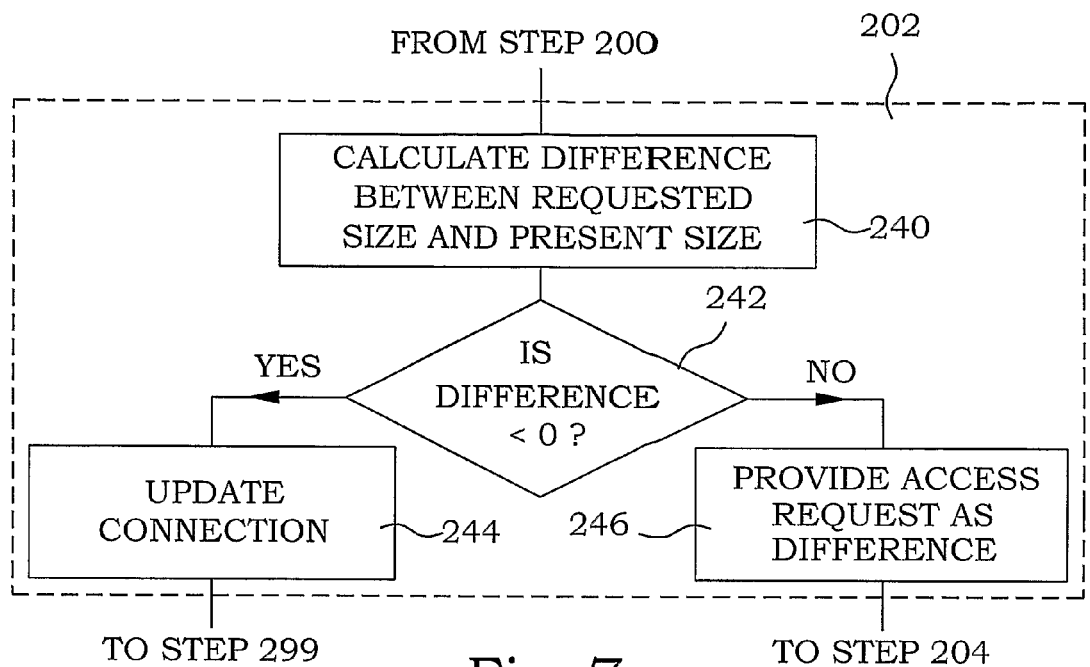
FIG. 7 is a part of a flow diagram illustrating another embodiment of the tehcnology disclosed herein supporting renegotiations of resources.

This embodiment can be viewed as a variant of the embodiment of FIG. 3, where the step 202 is provided with some additional features. The flow path between step 202 and step 299 then becomes of use. The step 202 according to the renegotiation embodiment is illustrated in FIG. 7. In step 240, the difference between the present resource capacity of the connection and the requested one is calculated. If the renegotiation involves a decrease in size, as determined in step 242, it will not influence the rest of the shared resource procedure. The connection is then updated in step 244 and the procedure continues directly to step 299 (FIG. 3). However, if an increased amount of resources is requested, a decision has to be made in the same direction as for a new connection. In step 246, a request of an additional access request is provided, which has resource requirements equal to the difference between requested and present size. This additional access request is then processed through the normal procedures, as illustrated by FIG. 3.

The principles are quite straightforward. If the bit-rate of a particular connection is to be reduced, then the utilisation parameters are simply updated appropriately. If the bit-rate of a particular channel is to increase, then it is necessary to execute the shared resource allocation principles with the difference rate as input rate. A decision is made with respect to whether or not the increase in resource utilisation is permitted. The utilisation parameters are accordingly updated by adding $\Delta r/C=(r'-r)/C$ to the current utilisation for the appropriate operator, where r' is the amount of resources required by the renegotiated connection and r is the amount of resources used by the original connection.

In the example embodiment described in connection with FIG. 3, the congestion threshold can be described as a hard threshold. This is because up to the point of congestion a connection of any size will be accepted for any operator. This, however, means that an operator may occupy a large chunk of the available resources when nearing hard congestion, which may counteract the intention to follow the agreed division of resources at congestion. In another example embodiment, a concept of soft congestion threshold is introduced. Soft congestion is a threshold that is lower than the hard congestion value. When the soft congestion threshold is exceeded, not all access requests are rejected, just the largest ones. In other words, only connections up to a certain size are accepted. A number of soft congestion thresholds may be set. For each threshold, the size of the largest permitted connection is also configured. These parameters are preferably static and can be defined by a management system.

Figure 8:
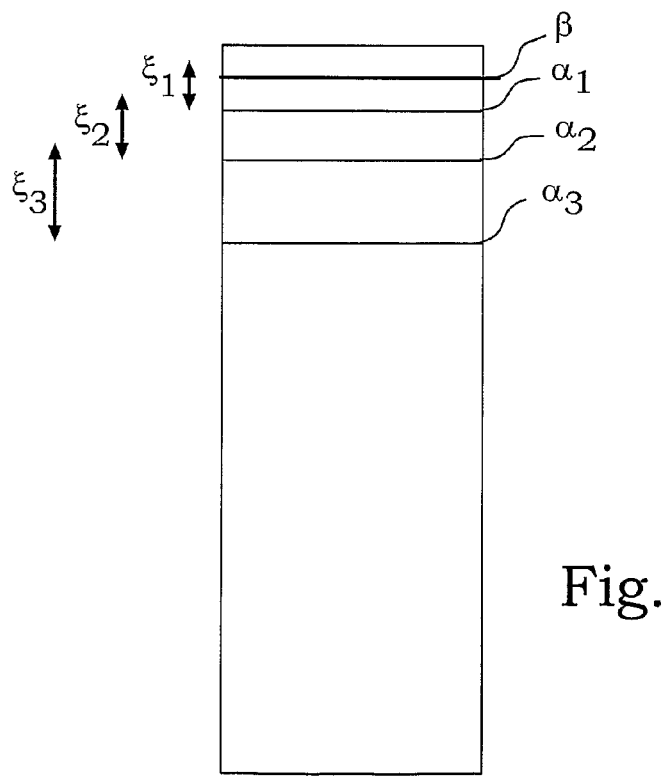
FIG. 8 is a diagram illustrating threshold levels in a soft congestion system according to an example embodiment.

FIG. 8 illustrated the basic principles of soft congestion thresholds. In the rectangle representing the total amount of resources, the hard congestion threshold $\beta$ is still present, relatively close to the maximum. However, three additional soft congestion thresholds $\alpha_1$, $\alpha_2$ and $\alpha_3$ are also illustrated. For each of these thresholds, a maximum accepted size $\xi_1$, $\xi_2$ and $\xi_3$, respectively, is set. If the total utilisation degree passes the threshold $\alpha_3$, only access requests of sizes less than $\xi_3$ are accepted. Similarly, if the total utilisation degree passes the threshold $\alpha_2$, only access requests of sizes less than $\xi_2$ are accepted, and if the total utilisation degree passes the threshold $\alpha_1$, only access requests of sizes less than $\xi_1$ are accepted.

Figure 9:
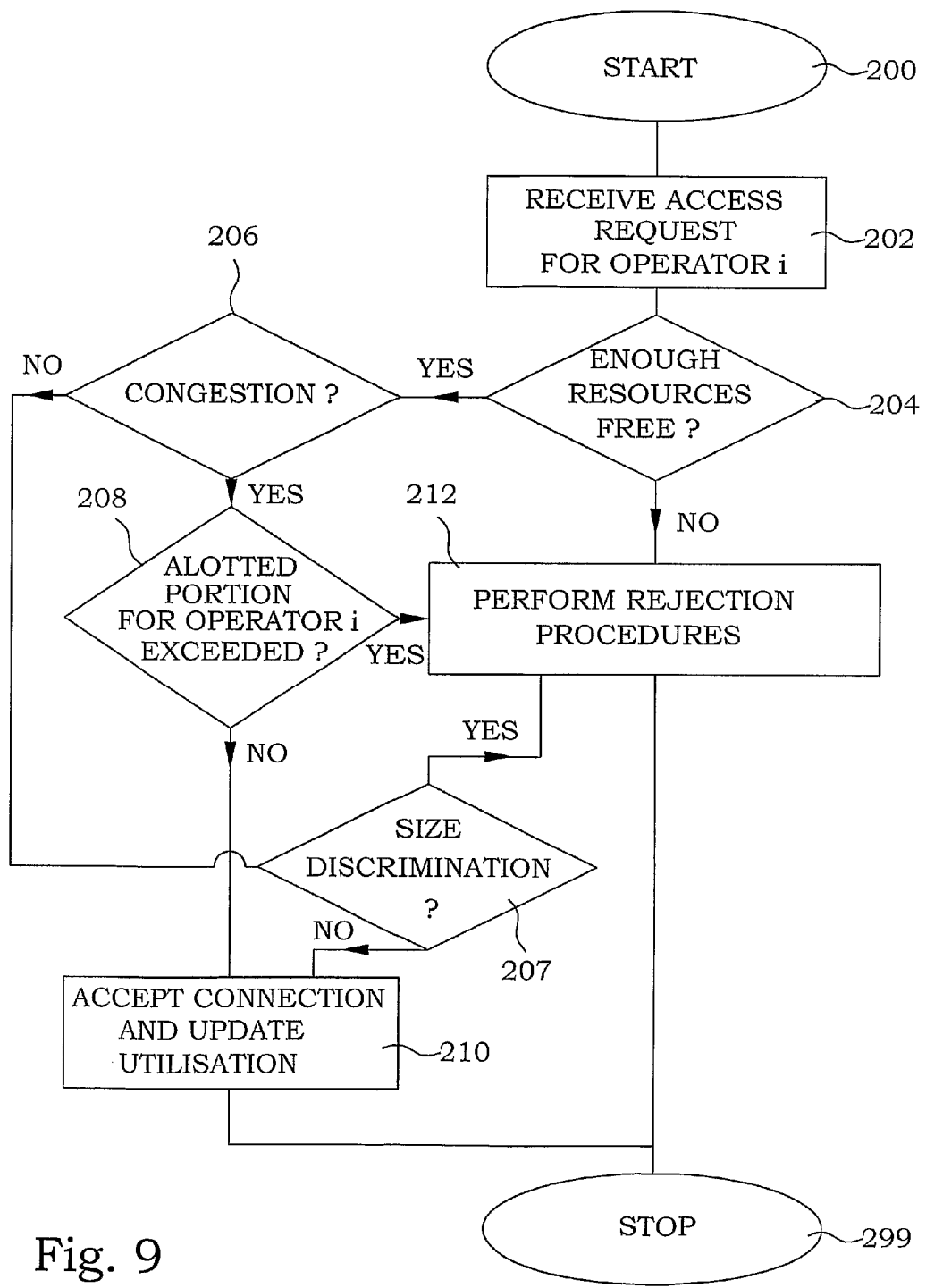
FIG. 9 is a flow diagram illustrating the main steps of a method according to an example embodiment utilising soft congestion discrimination.

These soft congestion thresholds can be incorporated in a flow diagram, illustrated in FIG. 9. Steps, which are in common with FIG. 3 are basically the same and are not further discussed. The main difference is the step 207. If it is concluded that no hard congestion is present in step 206, the flow continues to step 207. In this step, a size discrimination is performed according to the soft congestion principles. If the required size of the access request is too large, the access request becomes the object of a rejection procedure (step 212). If the access request is small enough, the access request will be accepted and the procedure continues to step 210.

In FIG. 10, the details of step 207 are illustrated. In step 250, a threshold class is determined for the system, which in principle denotes which soft congestion threshold $\alpha_n$ that is to be used. Each threshold class is associated with a maximum cost $\xi_n$, expressing the maximum size that is going to be accepted. If the connection cost, i.e. the size of the access request, is determined in step 252 to be larger than the maximum cost for that particular threshold class, the access request is rejected (step 212). Otherwise the access request is accepted (step 210).

In a more mathematical description, where m>0 is the total number of soft congestion thresholds, $j \in 1 \ldots m$ are the threshold class identifiers, $\alpha_j \in [0,1]$ are the soft congestion threshold values for threshold class j, $\xi_j$ is the largest permissible connection when in soft congested state for threshold class j, and where the soft congestion values are sorted such as $\alpha_k < \alpha_j$ for k<j, $k \in 1 \ldots m$, the soft congestion thresholds are lower than the hard congestion threshold $a_j < \beta$. An access request is received and in steps 204 and 206, it is concluded that there are sufficient free resources and the system is not hard congested. The start with j=m and decrement with one step at the time until the following condition is met:

$$\sum_{i=1}^{n} u_i(t) \geq T_j^S,$$

where $T_j^S$ is a threshold associated with the soft congestion threshold $\alpha_j$, preferably by the relation:

$$T_j^S = \alpha_j$$

or $$T_j^S = \alpha_j - r/C.$$

If the condition is met, then j is found (otherwise the access request is accepted right away). Now determine whether this connection is allowed for threshold class j. If $$r > s_j$$

then the connection cost exceeds maximum allowed cost for threshold class j and the access request is rejected. Otherwise, the access request is accepted.

The methods discussed above can be implemented in different manners in the mobile communications system. In a system having a shared UTRAN, it is, however, preferred to implement the approach in the RNC in connection with the Node B resource management functionalities.

In a shared UTRAN, each operator has its own frequency bandwidth and cells. Each operator then shares site, transmission, hardware, software, alarm and event handling for both Radio Base Station (Node B) and Radio Network Controller (RNC), as illustrated in FIG. 1. A shared Node B can have cells from more than one operator. The baseband resources in the Node B are a constrained resource, which can be shared amongst all cells in the Node B. FIG. 11 illustrates a Node B 25 and a RNC 22 of a shared resource system. The management of the connection between the Node B 25 and a mobile, i.e. the Ue interface, is performed in a Ue connection management unit 40 in the Node B 25. The allocation of the baseband resources is controlled by a capacity management function 42 in the RNC 22.

The Node B 25 reports the available resources as the total number of credits to the RNC 22. The Node B 25 also reports the cost of allocating a radio channel with a particular spreading factor in terms of a number of so-called credits. This cost is reported for all available spreading factors. This information can be used by the RNC 22 to make capacity management decisions. The RNC 22 maintains a picture of the Node B 25 resource utilisation based on the number of credits used. This picture can deviate from the actual resource usage and the Node B 25 can inform the RNC 22 by sending new values for total credit and spreading factor costs. This is defined in the 3G TS 25:433 NBAP Signalling Protocol Standard, sections 8.7.7, 8.2.15, 9.2.1.9A, and 9.2.1.20A [2].

The shared resource management problem described above maps to the problem of managing the baseband resources in a Node B 25. In UTRAN, Node B hardware resource management 44 is largely done in the RNC 22. A typical RNC 22 design of today would include some Node B capacity management functions, but these would have been designed for the single operator case. To manage the resources in the shared environment, additional functions for shared resources management 46 have to be supplied, either as an integrated part of the hardware resource management 44 or as an additional functionality. When the Node B needs a new connection, a new connection request or access request is sent to the RNC. The RNC utilises the functions 44 and 46 and delivers a response back to the Node B.

There are two prerequisites that need to be met before applying the procedures of the technology disclosed herein. The total credit information is reported by the Node B per uplink and downlink separately. The Node B reports the total credit information for a group of cells, as the procedures are designed to share resources in the cell group.

If the RNC's picture of resource utilisation differs from that of the Node B, The Node B can notify the RNC. The update procedure described above can be invoked each time the RNC receives such an update. The renegotiation procedure described above can be invoked whenever it is necessary to renegotiate the capacity of a connection, whether it is initiated by the network or the terminal. Finally the soft congestion solution is optional and can be introduced as part of the mechanism if desired.

The technology disclosed herein is an approach to managing shared resources in shared networks. As such, it is applicable in any case in which there is a linear or near linear approach to resource allocation used in a shared network context.

The approach can be directly applied in the concrete scenario of managing shared Node B baseband resources in a shared UTRAN. This is done in the RNC and the above disclosure describes how the new functions interact with existing capacity management functions to effect control over shared resources.

It will be understood by those skilled in the art that various modifications and changes may be made to the preferred embodiments presented above without departure from the scope of the invention, which is solely defined by the appended claims.

REFERENCES

[1] Shared Networks for WCDMA, Solution Description, April 2003.
[2] 3 GPP TS 25:433; 3rd Generation Partnership Project; Technical Specification Group Radio Access Network; UTRAN Iub interface NBAP signalling (release 5), sections 8.2.7, 8.2.15, 9.2.1.9A, and 9.2.1.20A.

The invention claimed is:

1. A method for managing resources in a communication system having resources shared by at least two operators, comprising:
    receiving an access request for a first operator of the at least two operators;
    executing a first determination whether there are sufficient amount of free resources shared by the at least two operators available in the communication system;
    executing a second determination whether a total amount of said resources shared by the at least two operators in use in the communication system exceeds a first threshold;
    executing a third determination whether a total amount of said resources shared by the at least two operators in use for the first operator exceeds a second threshold; and
    deciding on accepting the access request based on the results of the first, second and third determinations,
    wherein the act of executing the third determination is performed only if the second determination shows that the total amount of resources shared by the at least two operators in use in the communication system exceeds the first threshold.

2. A method according to claim 1, wherein the act of executing the second determination is performed only if the first determination shows that there are sufficient free resources shared by the at least two operators available in the communication system.

3. A method according to claim 2, wherein the access request is accepted if the third determination shows that the total amount of resources shared by the at least two operators in use for the first operator does not exceed the second threshold.

4. A method according to claim 1, wherein the access request is accepted if the second determination shows that the total amount of resources shared by the at least two operators in use in the communication system does not exceed the first threshold.

5. A method according to claim 1, further comprising the act of size discrimination based on the capacity requested by the incoming connection dependent on the total amount of resources shared by the at least two operators in use in the communication system if the second determination shows that the total amount of resources shared by the at least two operators in use in the communication system does not exceed the first threshold.

6. A method according to claim 5, wherein the size discrimination comprises:
    determination of a threshold class dependent on the total amount of resources shared by the at least two operators in use in the communication system;
    comparing an amount of resources required by the access request with a maximum accepted size associated with the determined threshold class;
    accepting the access request if the amount of resources required by the access request is smaller than or equal to the maximum accepted size; and
    rejecting the access request if the amount of resources required by the access request is larger than the maximum accepted size.

7. A method according to claim 1, wherein the first threshold is equal to a pre-determined congestion threshold of the shared by the at least two operators.

8. A method according to claim 1, wherein the first threshold is equal to a pre-determined congestion threshold of the shared by the at least two operators minus the amount of resources required by the access request.

9. A method according to claim 1, wherein the second threshold is equal to a pre-determined portion of the total resources shared by the at least two operators allocated to the first operator.

10. A method according to claim 1, wherein the second threshold is equal to a pre-determined portion of the total resources shared by the at least two operators allocated to the first operator minus the amount of resources required by the access request.

11. A method according to claim 1, further comprising the act of storing a respective measure of the fraction of resources shared by the at least two operators currently in use by each of said at least two operators, said measure for the first operator being updated upon accepting the access request or when an already established connection for the first operator is terminated.

12. A method according to claim 11, further comprising updating the respective measures by means of resource utilisation information from an external source.

13. A method according to claim 1, wherein the access request is rejected if the first determination shows that there are not sufficient free resources shared by the at least two operators available in the communication system or if the third determination shows that the total amount of resources shared by the at least two operators in use for the first operator exceeds the second threshold.

14. A method according to claim 1, further comprising evaluating a priority of the access request if the first determination shows that there are not sufficient free resources shared by the at least two operators available in the communication system or if the third determination shows that the total amount of resources shared by the at least two operators in use for the first operator exceeds the second threshold.

15. A method according to claim 14, wherein the act of evaluating the priority comprises:
  executing a fourth determination whether the sum of the free resources shared by the at least two operators available in the communication system and a total amount of resources shared by the at least two operators being occupied by traffic having a lower priority than the priority of the access request for the first operator is smaller than the amount of resources required for the access request for the first operator;
  rejecting the access request if the fourth determination shows that the sum of the free resources shared by the at least two operators available in the communication system and the total amount of resources shared by the at least two operators being occupied by traffic having a lower priority than the priority of the access request for the first operator is smaller than the amount of resources required for the access request for the first operator; and
  pre-empting on-going traffic sufficient to allow the access request for the first operator if the fourth determination shows that the sum of the free resources shared by the at least two operators available in the communication system and the total amount of resources shared by the at least two operators being occupied by traffic having a lower priority than the priority of the access request for the first operator is equal to or larger than the amount of resources required for the access request for the first operator, and accepting the access request.

16. A method according to claim 15, wherein the act of pre-empting in turn comprises:
  determining which operator of the at least two operators presently being in most excess of its target resource utilisation;
  selecting a connection of the operator of the at least two operators presently being in most excess of its target resource utilisation having a lower priority than the priority of the access request for the first operator;
  releasing the selected connection;
  determining whether the resources required for the access request is larger than the free resources shared by the at least two operators available in the communication system; and
  repeating the previous acts if the resources required for the access request is larger than the free resources shared by the at least two operators available in the communication system.

17. A method according to claim 1, wherein the act of receiving an access request for the first operator in turn comprises:
  receiving a renegotiation request for an ongoing call from the first operator;
  providing a supplementary access request for the first operator having an access request size corresponding to the difference between a requested size and a present size of the ongoing call, if the requested size is larger than the present size; and
  performing a change of resource utilisation for the ongoing call, if the present size is larger than the requested size.

18. A method of claim 1, wherein the acts of executing the first determination, executing the second determination, executing the third determination, and deciding on accepting the access request are performed by a node of the communication system.

19. A method of claim 1, wherein the second threshold is related to an agreed proportion of resources shared by the at least two operators for use by the first operator.

20. A device for managing resources in a communication system, the communication system having resources shared by at least two operators, said device comprising:
  means for receiving an access request for a first operator of the at least two operators;
  means for executing a first determination whether there are sufficient amount of free resources shared by the at least two operators available in the communication system;
  means for executing a second determination whether a total amount of said resources shared by the at least two operators in use in the communication system exceeds a first threshold;
  means for executing a third determination whether a total amount of said resources shared by the at least two operators in use for the first operator exceeds a second threshold; and
  means for deciding on accepting the access request based on the results of the first, second and third determinations.

21. An arrangement comprising a device for managing resources in a communication system, the communication system having resources shared by at least two operators, the device comprising:
  means for receiving an access request for a first operator of the at least two operators;
  means for executing a first determination whether there are sufficient amount of free resources shared by the at least two operators available in the communication system;
  means for executing a second determination whether a total amount of said resources shared by the at least two operators in use in the communication system exceeds a first threshold;

means for executing a third determination whether a total amount of said resources shared by the at least two operators in use for the first operator exceeds a second threshold; and means for deciding on accepting the access request based on the results of the first, second and third determinations.

22. An arrangement according to claim 21, wherein the arrangement is a shared universal mobile telecommunication system terrestrial radio access network and the device is comprised in a radio network controller.

23. An arrangement according to claim 21, wherein the arrangement is the communication system.

24. A node for managing resources in a communication system, the communication system comprising a radio access network (RAN) having resources shared by at least two operators, said device comprising:
   means for receiving an access request for a first operator of the at least two operators;
   a shared resources manager configured to execute plural determinations and to decide on accepting the access request based on the results of the plural determinations, the plural determinations including:
   a first determination whether there are sufficient amount of free resources shared by the at least two operators available in the communication system;
   a second determination whether a total amount of said resources shared by the at least two operators in use in the communication system exceeds a first threshold; and
   a third determination whether a total amount of said resources shared by the at least two operators in use for the first operator exceeds a second threshold.

25. A method for managing resources in a communication system having resources shared by at least two operators, comprising:
   receiving an access request for a first operator of the at least two operators;
   executing a first determination whether there are sufficient amount of free resources shared by the at least two operators available in the communication system;
   executing a second determination whether a total amount of said resources shared by the at least two operators in use in the communication system exceeds a first threshold;
   executing a third determination whether a total amount of said resources shared by the at least two operators in use for the first operator exceeds a second threshold;
   deciding on accepting the access request based on the results of the first, second and third determinations; and
   evaluating a priority of the access request if the first determination shows that there are not sufficient free resources shared by the at least two operators available in the communication system or if the third determination shows that the total amount of resources shared by the at least two operators in use for the first operator exceeds the second threshold.

26. A method according to claim 25, wherein the act of executing the second determination is performed only if the first determination shows that there are sufficient free resources shared by the at least two operators available in the communication system.

27. A method according to claim 26, wherein the act of executing the third determination is performed only if the second determination shows that the total amount of resources shared by the at least two operators in use in the communication system exceeds the first threshold.

28. A method according to claim 27, wherein the access request is accepted if the third determination shows that the total amount of resources shared by the at least two operators in use for the first operator does not exceed the second threshold.

29. A method according to claim 25, wherein the access request is accepted if the second determination shows that the total amount of resources shared by the at least two operators in use in the communication system does not exceed the first threshold.

30. A method according to claim 25, further comprising the act of size discrimination based on the capacity requested by the incoming connection dependent on the total amount of resources shared by the at least two operators in use in the communication system if the second determination shows that the total amount of resources shared by the at least two operators in use in the communication system does not exceed the first threshold.

31. A method according to claim 30, wherein the size discrimination comprises:
   determination of a threshold class dependent on the total amount of resources shared by the at least two operators in use in the communication system;
   comparing an amount of resources required by the access request with a maximum accepted size associated with the determined threshold class;
   accepting the access request if the amount of resources required by the access request is smaller than or equal to the maximum accepted size; and
   rejecting the access request if the amount of resources required by the access request is larger than the maximum accepted size.

32. A method according to claim 25, wherein the first threshold is equal to a pre-determined congestion threshold of the shared by the at least two operators.

33. A method according to claim 25, wherein the first threshold is equal to a pre-determined congestion threshold of the shared by the at least two operators minus the amount of resources required by the access request.

34. A method according to claim 25, wherein the second threshold is equal to a pre-determined portion of the total resources shared by the at least two operators allocated to the first operator.

35. A method according to claim 25, wherein the second threshold is equal to a pre-determined portion of the total resources shared by the at least two operators allocated to the first operator minus the amount of resources required by the access request.

36. A method according to claim 25, further comprising the act of storing a respective measure of the fraction of resources shared by the at least two operators currently in use by each of said at least two operators, said measure for the first operator being updated upon accepting the access request or when an already established connection for the first operator is terminated.

37. A method according to claim 36, further comprising updating the respective measures by means of resource utilisation information from an external source.

38. A method according to claim 25, wherein the access request is rejected if the first determination shows that there are not sufficient free resources shared by the at least two operators available in the communication system or if the third determination shows that the total amount of resources shared by the at least two operators in use for the first operator exceeds the second threshold.

39. A method according to claim 25, wherein the act of evaluating the priority comprises:

executing a fourth determination whether the sum of the free resources shared by the at least two operators available in the communication system and a total amount of resources shared by the at least two operators being occupied by traffic having a lower priority than the priority of the access request for the first operator is smaller than the amount of resources required for the access request for the first operator;

rejecting the access request if the fourth determination shows that the sum of the free resources shared by the at least two operators available in the communication system and the total amount of resources shared by the at least two operators being occupied by traffic having a lower priority than the priority of the access request for the first operator is smaller than the amount of resources required for the access request for the first operator; and pre-empting on-going traffic sufficient to allow the access request for the first operator if the fourth determination shows that the sum of the free resources shared by the at least two operators available in the communication system and the total amount of resources shared by the at least two operators being occupied by traffic having a lower priority than the priority of the access request for the first operator is equal to or larger than the amount of resources required for the access request for the first operator, and accepting the access request.

40. A method according to claim 39, wherein the act of pre-empting in turn comprises:

determining which operator of the at least two operators presently being in most excess of its target resource utilisation;

selecting a connection of the operator of the at least two operators presently being in most excess of its target resource utilisation having a lower priority than the priority of the access request for the first operator;

releasing the selected connection;

determining whether the resources required for the access request is larger than the free resources shared by the at least two operators available in the communication system; and repeating the previous acts if the resources required for the access request is larger than the free resources shared by the at least two operators available in the communication system.

41. A method according to claim 25, wherein the act of receiving an access request for the first operator in turn comprises:

receiving a renegotiation request for an ongoing call from the first operator;

providing a supplementary access request for the first operator having an access request size corresponding to the difference between a requested size and a present size of the ongoing call, if the requested size is larger than the present size; and performing a change of resource utilisation for the ongoing call, if the present size is larger than the requested size.

42. A method of claim 25, wherein the acts of executing the first determination, executing the second determination, executing the third determination, and deciding on accepting the access request are performed by a node of the communication system.

43. A method of claim 25, wherein the second threshold is related to an agreed proportion of resources shared by the at least two operators for use by the first operator.

\* \* \* \* \*

UNITED STATES PATENT AND TRADEMARK OFFICE
CERTIFICATE OF CORRECTION

PATENT NO. : 8,155,072 B2  
APPLICATION NO. : 10/581999  
DATED : April 10, 2012  
INVENTOR(S) : Warrillow et al.

Page 1 of 1

It is certified that error appears in the above-identified patent and that said Letters Patent is hereby corrected as shown below:

Title Page, Item (56), under "OTHER PUBLICATIONS", in Column 2, Line 5, delete "lub" and insert -- Iub --, therefor.

Signed and Sealed this
Sixth Day of November, 2012

David J. Kappos
*Director of the United States Patent and Trademark Office*